United States Patent [19]

Lackore

[11] 3,994,073
[45] Nov. 30, 1976

[54] AIR COOLING MEANS FOR UV PROCESSOR

[75] Inventor: James K. Lackore, Joliet, Ill.

[73] Assignee: PPG Industries, Inc., Pittsburgh, Pa.

[22] Filed: Apr. 8, 1975

[21] Appl. No.: 566,573

[52] U.S. Cl. .................................. 34/4; 34/160; 34/62
[51] Int. Cl.² .................... F26B 3/28; F26B 19/00
[58] Field of Search ........................... 34/4, 62, 160

[56] References Cited
UNITED STATES PATENTS

| | | | |
|---|---|---|---|
| 2,473,629 | 6/1949 | Andrews | 34/160 X |
| 3,181,250 | 5/1965 | Vits | 34/160 X |
| 3,398,466 | 8/1968 | Brown | 34/160 |
| 3,831,289 | 8/1974 | Knight | 34/4 |

Primary Examiner—John J. Camby
Attorney, Agent, or Firm—J. Timothy Keane; Carl T. Severini

[57] ABSTRACT

Air cooling means useful in conjunction with UV processors, i.e. apparatus for treating products with ultraviolet light, is adapted to impinge relatively high velocity cooling air onto the product being treated while minimizing contact of the cooling air with the lamp providing the ultraviolet light. The air cooling means comprises oppositely spaced slot-like nozzles and an exhaust channel to remove the air without contacting the ultraviolet lamp. In preferred embodiments, the nozzles direct the air angularly away from the ultraviolet lamp and toward a longitudinal exhaust channel positioned between and above the nozzles. It is preferred that the UV processor have a plurality of ultraviolet lamps with air cooling means adjacent to and following each such lamp.

13 Claims, 4 Drawing Figures

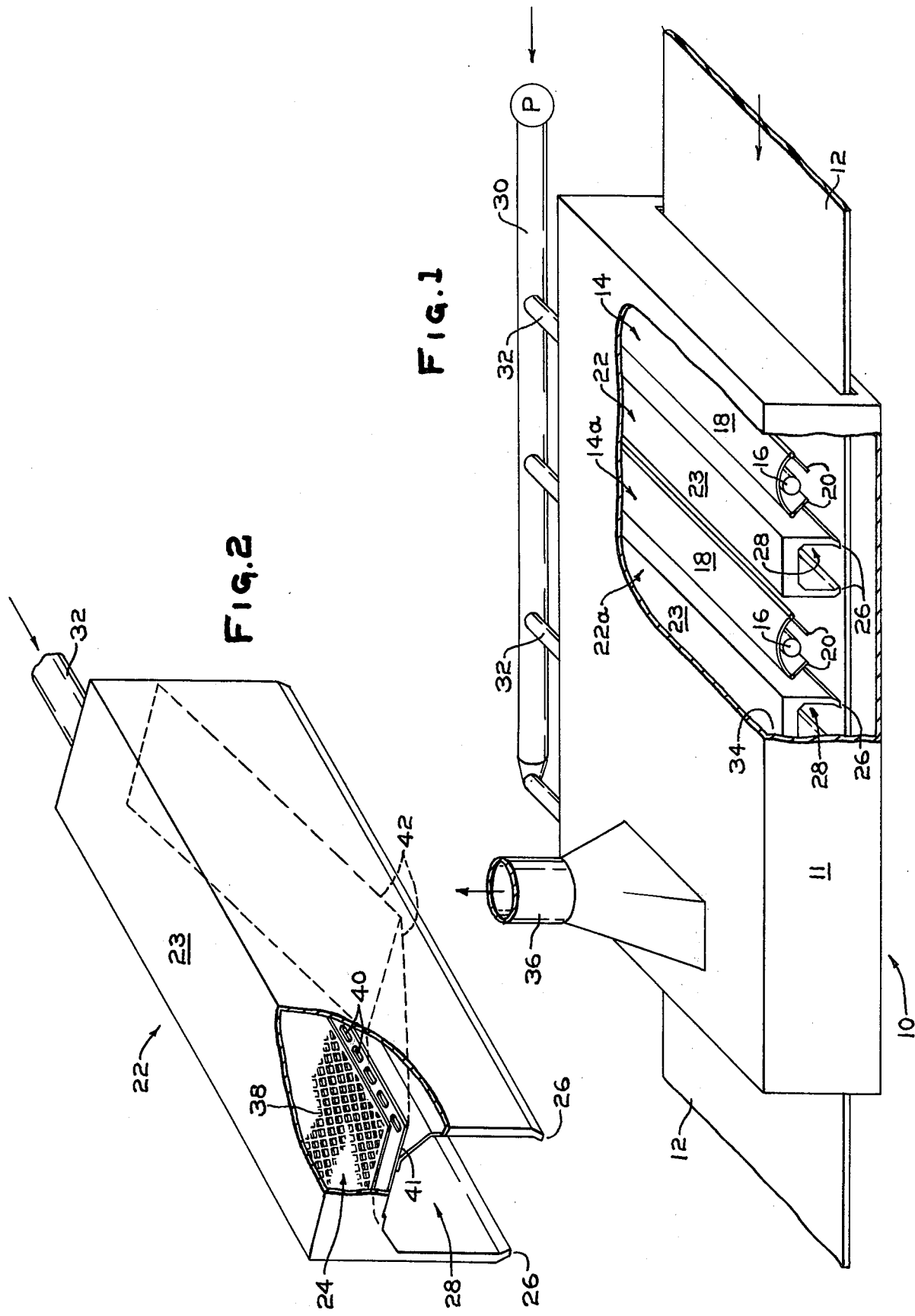

AIR COOLING MEANS FOR UV PROCESSOR

BACKGROUND OF THE INVENTION

Processes in which products are treated with ultraviolet light (UV) to effect polymerization, sterilization, etc., and in particular, the use of ultraviolet light for the curing of coatings, inks and similar materials, are becoming of increasing interest. Equipment designed for such processes is variously called a UV processor, UV drying oven, or other similar terms, but in general comprises one and usually several ultraviolet light lamps positioned so as to direct UV radiation onto a workpiece passed beneath the lamps, usually on a moving conveyor or web.

More recently, designs of such equipment have included various features to overcome problems encountered during utilization of the equipment in various types of processes. These features may include, for example, provision for maintaining an inert atmosphere within the UV processor, certain specialized reflector designs, shutters for blocking, as desired, some or all of the ultraviolet light from reaching the workpiece, and cooling means associated with the reflectors and shutters to remove some of the heat generated by the ultraviolet lamps. U.S. Pat. Nos. 3,733,709; 3,745,307; 3,769,517; 3,790,801; and 3,826,014 describe examples of such equipment.

As indicated, considerable heat is generated by the ultraviolet lamps and heretofore part of such heat has been removed by air or water cooling of the reflectors, shutters or other component parts of the UV processor. Usually it is not believed necessary to cool the workpiece itself, since heat often aids in effecting the desired polymerization, sterilization, or the like. It has been found, however, in some cases, and particularly where the product being treated comprises a material which can be adversely affected by prolonged heating, that it is desirable to control the surface temperature of the workpiece and to remove the heat from the workpiece as soon as possible following the treatment with UV radiation thereby preventing excessive buildup of the heat in the workpiece while it is passing under a plurality of UV lamps. Moreover, it is in such cases particularly desirable to provide for removing heat from the surface of the workpiece which is exposed to the ultraviolet radiation because this helps to prevent the heat from penetrating the workpiece. Cooling of the workpiece by cooling the conveyor or web, for example, does not achieve this result.

One instance where heat penetration and buildup is a problem is in the application of thin coatings to wood substrates, where it is desirable to remove the heat from the surface portion of the coated substrate before the heat penetrates and builds up in the wood substrate. Because wood and similar materials do not lose heat rapidly, if such builup occurs the heat is retained for unduly long periods thereby resulting in possible deterioration of the substrate and/or the coating thereon. Heat buildup is also a problem with coatings on thin metal substrates, which may flex due to expansion before the coating is fully cured, and with plastic substrates which may deform due to excessive heat.

While it is desirable to remove some of the heat generated by the ultraviolet lamp, it is usually not desirable to permit currents of cooling air to contact the lamp surface itself, because differential cooling of the bulb surface results with attendant deterioration and premature failure of the lamp. Thus, the cooling should be localized, insofar as possible, at the surface of the workpiece.

It has been suggested heretofore to utilize high-velocity air to cool a product being treated with ultraviolet light. The apparatus described for such purpose utilizes large volumes of air which then pass over and around the product, without provision for localizing the cooling by directing the inlet air and exhaust in the manner necessary, as described herein.

SUMMARY OF THE INVENTION

The present invention provides means for removing from the surface of a workpiece being treated with ultraviolet light as discussed hereinabove, the heat generated by the UV lamp within a relatively short time of such treatment, by utilizing a narrow stream of high velocity air which is removed through an exhaust channel immediately after contacting the workpiece.

The invention provides for this purpose air cooling means which comprises an elongated housing defining an enclosed passageway into which there is an air inlet, air being directed from said inlet into the passageway and out through oppositely-spaced narrow slot-like nozzles extending longitudinally along the bottom of the housing. The air is directed in a narrow stream at relatively high velocity through the nozzles onto the workpiece and into an exhaust channel between the nozzles from where it is removed through an exhaust channel before the cooling air can reach the area of the ultraviolet lamp itself. The exhaust channel extends longitudinally parallel to the slot-like nozzles and between the inner walls of the housing, above and between the nozzles. The nozzles preferably direct the air in an angle to the horizontal plane of the path of travel of the workpiece, toward each other and into the exhaust channel. In a UV processor, the air cooling means is ordinarily positioned adjacent to and following an ultraviolet lamp along the path of travel of the workpiece. Where a plurality of ultraviolet lamps is utilized, as is ordinarily the case, it is preferred that each such lamp be followed by air cooling means as described.

DESCRIPTION OF THE DRAWINGS

In the drawings:

FIG. 1 is a perspective view of a UV processor with a cutaway section showing lamps and air coolers in the interior of the processor.

FIG. 2 is a perspective view of an air cooler with cutaway sections showing details of the interior construction.

In FIG. 1, UV processor 10 comprises a substantially enclosed chamber 11 having inlet and outlet openings defining a path of travel along a horizontal plane for a workpiece 12 to be treated therein. The workpiece is commonly passed through on a conveyor or web which may be continuous or intermittent and which may be driven by suitable conventional means (not shown). The workpiece passes under ultraviolet lamp assemblies 14 and 14a, each comprising an ultraviolet lamp 16 and a reflector 18 and shutters 20, the reflector and shutters being optional but preferred. The reflector and shutters may be cooled with air, water or the like if desired. Air coolers 22 and 22a are each adjacent to a lamp and each comprises an elongated housing 23 having at the bottom edge of the housing oppositely spaced slot-nozzles 26. These slot-nozzles are narrow (compared to their length) and extend longitudinally along the bottom of each side of the housing. Between the slot nozzles and extending parallel to and above them is exhaust channel 28, through which air is exhausted after impinging on the workpiece. Air enters the air cooler through air manifold 30 and inlet 32 and is removed from the UV processor through passageway 34, which lies between housing 11 and the ends and top of the coolers and lamps, and exhaust duct 36 which is connected to any suitable exhausting fan (not shown).

FIG. 2 shows the air cooler 22 in more detail, the air cooler having housing 23 defining an interior passageway 24 through which air entering from inlet 32 passes into and along the housing. In order to reduce turbulance of the air entering the cooler and to assist in distributing the air more evenly along the housing before it passes through slot-nozzles 26, it is desirable to provide distributing means along the passageway. One convenient such distributing means is mesh-like member 38 which is disposed across the passageway between-air inlet 32 and slot-like nozzles 26. After passing through distributing means 38, the air passes through air orifices 40 in plate 41 and into slot-like nozzles 26. The relatively narrow slot-nozzles direct the air in a relatively narrow stream, preferably at an angle to the path of travel of the workpiece and toward each other and into exhaust channel 28. The exhaust channel is adapted to remove the air from each of the ends thereof. To assist in this the exhaust channel preferably contains means for directing the air toward the ends, thereby to assist in exhausting the air more quickly, such as baffle members 42 which extend longitudinally along the channel and across the channel in a horizontal plane and are sloped from near the bottom center of the channel to each top end.

FIG. 3 shows the air cooler in an end view with the end of the housing removed. The air cooler is shown with housing 23 defining passageway 24 into which air enters from air inlet 32 through distributing means 38 and air orifices 40 in plate member 41 and down into air ducts 44. These air ducts, formed by the outer wall of housing 23 and the wall of exhaust channel 28, are longitudinally elongated but are relatively narrow in width, compared to their other dimensions. From these ducts air passes through slot nozzles 26 onto the workpiece and thereafter into exhaust channel 28, where baffle members 42 assist in directing the air toward the ends and away from the apparatus.

FIG. 4 further shows the air cooler in a side view cut along section IV—IV of FIG. 3. As shown, air cooler 22 comprises housing 23 into which air enters from inlet 32 into passageway 24 and through distributing means 38 and plate 41 (having air orifices therein) into and out of slot nozzles 26. The positions of baffles 42 and exhaust channel 28 are also shown.

DETAILED DESCRIPTION OF THE INVENTION

Figure 3:
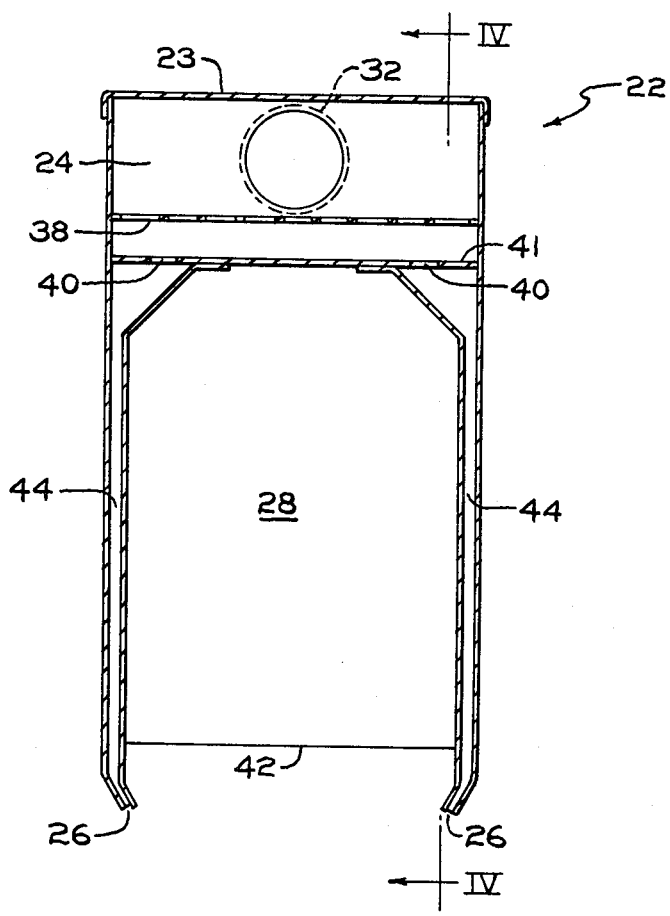
FIG. 3 is an end elevational view of the air cooler, shown with the end of the housing removed.
Figure 4:
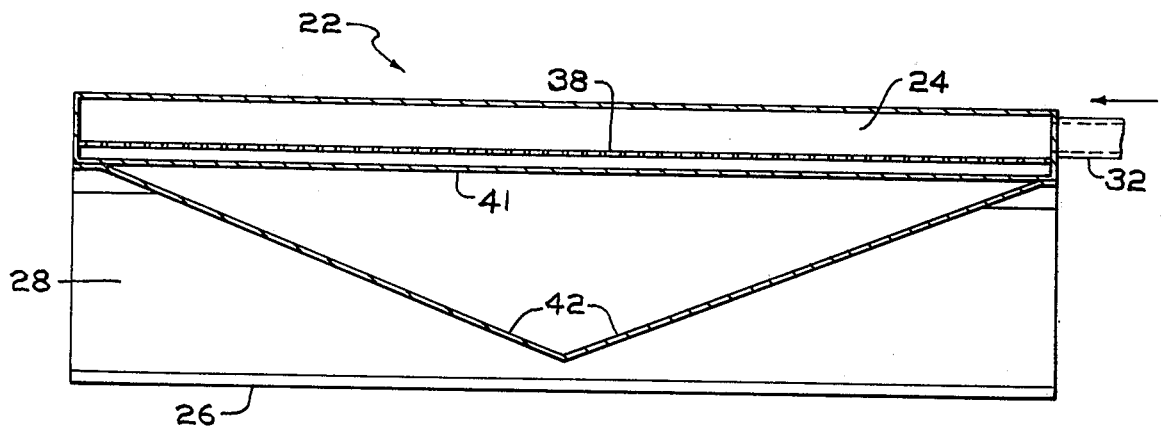
FIG. 4 is a side elevational view of the air cooler as shown in FIG. 2 cut along Section IV—IV of FIG. 3.

The apparatus as described can be of any suitable size or shape, depending upon the nature of the product or workpiece to be treated therein. The UV processor is ordinarily rectangular in shape with inlet and outlet openings in each of the shorter sides. These establish the path of travel for the workpiece to be treated, which enters the inlet and exits the outlet. The lamps and air coolers are positioned within the UV processor so that at least a portion of the path of travel lies beneath them. While as few as one lamp and one air cooler can be utilized in a UV processor, ordinarily a plurality of lamps, e.g. two to 12 or more, are utilized and it is preferred that an air cooler follow each lamp. However, other configurations can be employed if desired, such as interspersing one or several air coolers among a plurality of lamps. The UV processor and its component parts can be made of any suitable material. The processor housing is usually steel or a similar metal; stainless steel is an excellent material of construction but because of its high cost galvanized steel or enameled steel is more often employed.

The air cooler itself can also be made of any suitable material with galvanized steel most commonly utilized. The size and shape of the air cooler depends upon the size and shape of the UV processor in which it is to be employed. Preferably, the air cooler extends substantially or entirely across the path of travel of the workpiece to be treated so as to impinge air onto the entire workpiece as it passes beneath, and thus is of a size commensurate with the conveyor system employed.

The details of construction of the air cooler as illustrated are not critical. However, it is important that the slot-like nozzles be combined with exhaust means so as to direct and impinge a relatively narrow stream of air at relatively high velocity onto the workpiece. This is ordinarily accomplished by utilizing oppositely spaced narrow slot-like nozzles extending longitudinally along the bottom of each side of the air cooler housing. The slot-like nozzles are relatively narrow in width compared to their length; for example, in an air cooler 48 inches in length the nozzles are ordinarily each 0.01 to 0.1 inch in width. Means for varying the width of the nozzle opening may be included, if desired. In a UV processor, the air cooler is positioned so that the bottom of the nozzles is close enough to the surface of the workpiece so as to impinge the air directly onto the surface. The distance varies with different types of workpieces, but it is usually desired that the end of the nozzle be about 1 to 2 inches from the surface. If desired, means for varying this distance can be provided, either by changing the position of the whole air cooler or by varying the configuration of the slot-like nozzle.

The air cooler also comprises exhaust means for removing air from the path of travel in a direction away from the ultraviolet lamp. To assist in this, the nozzles are preferably directed toward each other, usually at about a 60° angle to the path of travel of the workpiece, with the exhaust means comprising a longitudinal channel positioned between and above the slot-like nozzles. With this arrangement, the air impinges onto the workpiece and is immediately carried up into the exhaust channel, where baffles can be used if desired to direct the air toward the ends of the channel where it can be removed through passageways between the ends of the coolers and lamp assemblies and the housing of the UV processor. The air is removed from the UV processor using one or more ducts which can be positioned in any suitable part of the UV processor, such as in the top of the housing, and a suitable exhaust fan. The baffles in the exhaust channel are preferably sloped members extending more or less horizontally across the channel and from near the bottom center of the channel to the top or near the top of the ends thereof; such baffles can be placed at any suitable angle, depending upon the length and shape of the air cooler, so as to assist in directing the air in the manner desired. However, other baffle shapes and arrangements can be employed to achieve this purpose, such as curved extensions or attachments placed on the walls of the channel.

The slot-like nozzles are ordinarily narrowed extensions of the air ducts on either side of the air cooler with the inner wall of the air duct defining the exhaust channel. These air ducts extending to the nozzles are preferably relatively narrow compared to their length, thus serving to straighten and direct the flow of air to the nozzles, but they otherwise need not be of any particular size or shape. For example, they may be tapered. In the air cooler as illustrated, air enters the air ducts through air orifices in the plate extending across the passageway. The use of a plate member in such an arrangement serves to stiffen and strengthen the air cooler, and the air orifices in the plate which serve to pass the air can be of any size or shape, or the orifices and the plate member can be dispensed with entirely, if desired, so long as a sufficient passageway for air to reach the nozzles is provided.

Also optionally included is distribution means in the passageway through which air entering the air cooler passes before entering the air orifices and flowing into the air ducts. The distributing means serves to reduce turbulence in the air flow and to distribute the air as evenly as possible longitudinally along the ducts leading to the nozzles. The distribution means is conveniently a mesh-like material and is usually an expanded metal grid which can be conveniently made of galvanized steel, aluminum or other metal; plastics and other materials may also be used.

The air inlet into the air cooler need only be of a size sufficient to permit the entry of enough air to achieve the desired air flow, and thus its size and shape are not critical. While the air inlet is illustrated as entering at one end of the air cooler, the air inlet can, if desired, be placed in the top or sides of the cooler, so long as air enters the passageway in the manner desired.

The other components of the UV processor as illustrated are conventional. Thus, for example, the pump or fan for introducing air into the manifold, a conveyor system used to pass the workpiece through the processor, the system for exhausting air from the processor, and other such components, all can be of any type known in the art which provide the desired functions. The ultraviolet lamps employed can be any of the commercially available lamps which emit light in the ultraviolet region and preferably are lamps which emit in the range of 2,000 to 4,000 angstroms. High or low pressure mercury vapor lamps or metal halide vapor lamps are generally utilized, and are ordinarily in the form of long tubes made of fused quartz having an electrode at both ends. Lamps of these general types are readily available.

Commonly used along with the lamp is a reflector made of an ultraviolet light refective material such as bright aluminum sheet. The reflector usually extends along the length of the ultraviolet lamp and can be of any suitable shape, such as an ellipse or series of interconnected ellipses.

The lamp assembly also commonly includes a movable shutter, which in closed position prevents radiation from the lamp from reaching the path of travel of the workpiece and which in open position permits the radiation to pass to the path of travel. Operation of the shutter can be manual or automatic, and intermediate positions can be provided if desired.

A number of other components can be provided in the UV processor as desired. For example, there can be provided means for cooling the reflector, shutter and other parts, using air or liquid cooling means, with water cooling being preferable. There can also be provided, if desired, means for adjusting the positions of the lamp assemblies and the air coolers relative to each other and to the path of travel, this being particularly useful when workpieces of different sizes and shapes are to be employed. Also, various types of inlet and outlet opening designs can be employed, one purpose of such differing designs being to accommodate workpieces of different sizes and shapes and also to prevent leakage of ultraviolet radiation and to prevent direct viewing of the ultraviolet lamps from outside the processor. If desired, means for varying the distribution of air among several air coolers can be provided, such as adjustable dampers in the air inlets to the coolers. Means for controlling the humidity of the cooling air can also be provided if desired, this providing the advantage of permitting use of the cooling air to assist in control of the evaporation of water and other liquids from the workpiece.

The apparatus of the invention can be used with any workpiece which one desires to treat with ultraviolet light. However, the advantages achieved by the air cooling means to which the invention is directed are particularly important with workpieces comprising a substrate having thereon a coating, which may be a protective or decorative coating, ink, or the like, which is to be dried and/or cured using UV light. In such embodiments the air coolers of the invention provide not only efficient cooling at the time and place it is most needed, i.e., on the surface immediately after exposure to the lamp, but also a wiping and leveling action on the coating itself which assists in providing a final coating of the desired properties.

Various ultraviolet light curable coatings, inks and the like, are known in the art and these can be utilized with the apparatus of the invention. These ultraviolet light curable compositions ordinarily contain at least one polymer, oligomer or monomer which is photosensitive, i.e., reacts in the presence of ultraviolet light.

Virtually any substrate can be used with such coatings, including wood and wood products, glass, metals and plastics of various types. The apparatus of the invention is particularly useful with substrates which are adversely affected by continued exposure to heat, such as wood, fiberboard, particleboard and various plastics, as well as certain metal substrates, such as metal sheets which may bend or warp due to differential thermal expansion.

The apparatus as described can be operated in various ways depending upon the type of product being treated and its characteristics. Ordinarily, when coated substrates are treated, sufficient air is utilized to achieve an air flow having a nominal velocity at the nozzles of the air cooler of from about 5,000 to about 13,000 feet per minute. At such velocities, the volume of air needed depends, of course, upon the size of the air cooler. For example, using a UV processor containing 12 water cooled lamp assemblies, each having an ultraviolet lamp 50 inches long and rated at a nominal linear power density of 200 watts/inch, and each followed by an air cooler as described, each air cooler being 50 inches long, 6½ inches wide and 9½ inches high with nozzles each 1/16 inch wide, the total volume of air passing through the air manifold into the air coolers is 600 to 700 cubic feet per minute.

While the invention has been described in connection with the use of air as the cooling medium, it should be understood that other gases can be used in an equivalent manner. For example, an inert gas, such as nitrogen, can be employed where one wishes to provide and maintain an inert atmosphere in the UV processor.

According to the provisions of the patent statutes there are described above the invention and what are now considered to be its best embodiments. However, within the scope of the appended claims it is to be understood that the invention can be practiced otherwise than as specifically described.

I claim:

1. In an apparatus for treating a workpiece with ultraviolet light, said apparatus comprising a substantially enclosed chamber having inlet and outlet openings defining a path of travel for said workpiece and at least one ultraviolet lamp positioned over at least a portion of said path of travel, the improvement comprising air-cooling means positioned within said chamber and adapted to impinge air onto said workpiece but not onto said lamp, said air-cooling means comprising an elongated housing defining an enclosed passageway through which air entering said housing is directed through narrow slot-like nozzles onto the path of travel of said workpiece;

said slot-like nozzles being spaced oppositely and longitudinally along the bottom of each side wall of said housing;

said air-cooling means further comprising exhaust means including longitudinal channel positioned between and above said slot-like nozzles.

2. The improvement of claim 1 wherein said slot-like nozzles are adapted to direct air angularly to said path of travel and in a direction toward each other and away from the ultraviolet lamp adjacent thereto.

3. The improvement of claim 1 in which said ultraviolet lamp is in a lamp assembly including a reflector.

4. The improvement of claim 1 in which said ultraviolet lamp is in a lamp assembly including a movable shutter which in closed position prevents radiation from said lamp from reaching the path of travel of the workpiece and which in open position permits said radiation to reach said path of travel.

5. The improvement of claim 1 in which said apparatus includes a plurality of ultraviolet lamps and a plurality of air-cooling means, each of said air-cooling means being adjacent to and immediately following an ultraviolet lamp along said path of travel.

6. The improvement of claim 1 in which the enclosed passageway in said air-cooling means includes an inlet for air to enter said passageway and positioned between said inlet and said slot-like nozzles there is disposed a mesh-like member for reducing the turbulence of and distributing the air entering said passageway.

7. The improvement of claim 6 in which said mesh-like member is an expanded metal grid.

8. Air-cooling means for use in apparatus for treating products with ultraviolet light, said air-cooling means comprising an elongated housing defining an enclosed passageway;

an air inlet into said passageway;

oppositely spaced narrow slot-like nozzles extending longitudinally along the bottom of said housing; and an exhaust channel between the walls of said housing and extending above and between said slot-like nozzles.

9. The air-cooling means of claim 8 wherein said slot-like nozzles are adapted to direct air in an angle inclined toward each other and toward said exhaust channel.

10. The air-cooling means of claim 8 further comprising distributing means for reducing turbulence of air entering said passageway and distributing said air along said slot-like nozzles.

11. The air-cooling means of claim 10 in which said distributing means comprises a mesh-like member disposed across said passageway and between said inlet and said slot-like nozzles.

12. The air-cooling means of claim 8 in which said exhaust channel includes means for directing air toward the ends thereof thereby to assist in exhausting said air more quickly.

13. The air-cooling means of claim 12 wherein said means for directing air includes baffle members which extend across and longitudinally along said channel and which are sloped from near the bottom center of said channel to the top ends thereof.

* * * * *